Patented Oct. 20, 1942

2,299,510

UNITED STATES PATENT OFFICE 2,299,510

DELAY SCREEN MATERIAL AND METHOD OF MAKING THE SAME

Albert Steadman, Nutley, N. J., assignor to Allen B. Du Mont Laboratories, Inc., Passaic, N. J., a corporation of Delaware No Drawing. Application January 24, 1941, Serial No. 375,766

12 Claims. (Cl. 250—81)

My invention relates to improvements in delay-screen materials for cathode-ray tubes and the method of making the same.

In accordance with my invention, there is produced a white fluorescent material having a strong phosphorescence for use in cathode-ray tubes built for the reception of television signals. Cathode-ray tubes having a fluorescent screen of my improved material, can be used to improve the reception of a 30-frame picture, or to receive a 15-frame signal without exhibiting those periods of light and darkness designated as "flicker."

Other objects and advantages of my invention will hereinafter appear.

My improved delay-screen material is composed of calcium hydroxide and the purest silica ($SiO_2$) obtainable and used in such proportions that an excess of silica, above the amount necessary to form calcium metasilicate, is present by 100%. Use of this excess of silica has been found to give higher luminosity. A mixture of these components activated to produce a blue fluorescent material, and a mixture of these same components activated, however, to produce a yellow fluorescent material, are combined to make up or constitute my improved, white, delay-screen material. Since the time required to activate each of these mixtures is different, I have found it advisable to activate both separately, and to obtain the final, white, delay-screen material by blending the two. The two mixtures, however, might be activated together. I have found, also, that by maintaining the activating temperature below the point at which fusion takes place, by about 25 degrees centigrade, that the physical condition of the product is such that a minimum amount of grinding is necessary to prepare the same for application in cathode-ray tubes, thereby resulting in better luminosity. Both components are made on the same base, and have the same or very similar physical characteristics. The advantage of this is that any tendency to separate from a suspension at different speeds is eliminated. Also, the rate of settling is so slow that mechanical agitation to maintain a uniform mixture for application in cathode-ray tubes in unnecessary.

The point at which fusion takes place is very indefinite, and can be varied by as much as 200 degrees centigrade by incorporating into the mixture of calcium hydroxide and silica a low-melting compound as a flux, or agent of acceleration, as will be well understood by those skilled in the art.

The mixture referred to above as having the characteristic of blue-fluorescence, is prepared as follows.

In distilled water, in a pebble mill, there are ground 50 grams of calcium hydroxide, 80 grams of silica, and a sufficient quantity of lead oxide. The quantity of lead oxide, to obtain activation, can vary within relatively wide limits. Amounts of lead oxide from 0.5 gram to 5.0 grams have been added to the above quantities of calcium hydroxide and silica, and activation has been satisfactory in all cases.

The water suspension is next removed from the mill, the water is removed by evaporation, and the material is then heated to 130 degrees centigrade, to complete dryness. The residue is of extreme fineness.

The dried residue is now heated to effect the necessary chemical combination of the calcium hydroxide and the silica, and its fluorescent activation. This temperature can vary according to the flux added. When no flux was added, the maximum safe temperature was 1050 degrees centigrade, and best results in luminosity were obtained when the mixture to be activated was held at this temperature for a period of twenty-four hours. Satisfactory results can be obtained, however, by using a lower temperature for a longer period of time.

The mixture referred to above as having the characteristic of yellow-fluorescence, is prepared as follows.

In distilled water, in a pebble mill, there are ground 50 grams of calcium hydroxide, 80 grams of silica, and a sufficient quantity of manganese fluoride. The quantity of manganese fluoride, to obtain activation, can vary within relatively wide limits. Amounts of manganese fluoride from 0.02 gram to 1.5 grams have been added to the above quantities of calcium hydroxide and silica, and activation has been satisfactory in all cases.

The water suspension is next removed from the mill, the water is removed by evaporation, and the material is then heated to 130 degrees centigrade, to complete dryness. The residue is of extreme fineness.

The dried residue is now heated to effect the necessary chemical combination of the calcium hydroxide and the silica, and its fluorescent activation. This temperature can vary according to the flux added. When no flux was added, the maximum safe temperature was 1050 degrees centigrade, and best results in luminosity were obtained when the mixture to be activated was held at this temperature for a period of two hours. Satisfactory results can be obtained, however, by using a lower temperature for a longer period of time.

The above-mentioned blue-fluorescent and yellow-fluorescent materials are now blended by grinding them together in a pebble mill using an organic compound such as an alcohol, ketone or ester, about 1.75 cubic centimeters of such liquid being used for each gram of fluorescent material to be ground. The proportions of blue-fluorescent material and yellow-fluorescent material to be blended depend on the color desired in my improved white, delay-screen material. In one case, 90% blue-fluorescent delay-screen material and 10% yellow-fluorescent delay-screen material, when ground together, produced a shade of white which is very pleasing to the eye. By varying these proportions, however, different shades of luminosity can be produced from blue to yellow.

The physical characteristics of the luminosity produced in a cathode-ray tube for television reception, having a screen made of my improved delay-screen material, are such that the maximum luminosity of cathode-fluorescence is twice to three times the luminosity of the phosphorescence or so-called after-glow, and the white phosphorescence is visible .06 second (plus or minus .01 second) after the delay-screen material has been brought to maximum cathode-fluorescence by impact of the cathode-ray beam and the beam has been cut off.

In lieu of calcium hydroxide, there may be used any salt of calcium which, when subjected to heat, leaves a residue of calcium oxide. Furthermore, the proportions, temperatures and periods of time specified, are not critical.

I claim as my invention:

1. The process of producing delay-screen material that is of white fluorescence under cathode ray bombardment, which comprises activating the reaction products of silica and a calcium compound, said calcium compound being of a character which leaves a residue of calcium oxide when subjected to heat, to produce blue fluorescent material and yellow fluorescent material, respectively, and blending the two materials.

2. The process of claim 1, in which the products are activated separately.

3. The process of claim 1, in which the products are activated together.

4. The process of producing delay-screen material that is of white fluorescence under cathode ray bombardment, which comprises activating the reaction products of silica and calcium hydroxide to produce blue fluorescent material and yellow fluorescent material, respectively, and blending the two materials.

5. The process of claim 4, in which the silica is in excess of that necessary to form metasilicate.

6. The process of claim 4, in which the activating temperature is below that at which fusion of the reaction products takes place.

7. The process of claim 4, in which the activating temperature is about 25° C. below that at which fusion of the reaction products takes place.

8. The process of claim 4, in which lead oxide is used to produce blue fluorescence.

9. The process of claim 4, in which manganese fluoride is used to produce yellow fluorescence.

10. The process of claim 4, in which the proportion of calcium hydroxide to silica is about 5 to 8 by weight.

11. Delay-screen material of white fluorescence made up of the reaction products of silica and calcium hydroxide, a portion of which reaction products has been activated to produce blue cathode-fluorescence and another portion of which has been activated to produce yellow fluorescence.

12. Delay-screen material of white fluorescence made up of the reaction products of silica and calcium hydroxide, a portion of which reaction products has been activated by lead oxide to produce blue cathode-fluorescence and another portion of which has been activated by manganese fluoride to produce yellow fluorescence.

ALBERT STEADMAN.